(No Model.)
C. J. GUSTAVESON.
HOPPLE.
No. 253,373.  Patented Feb. 7, 1882.
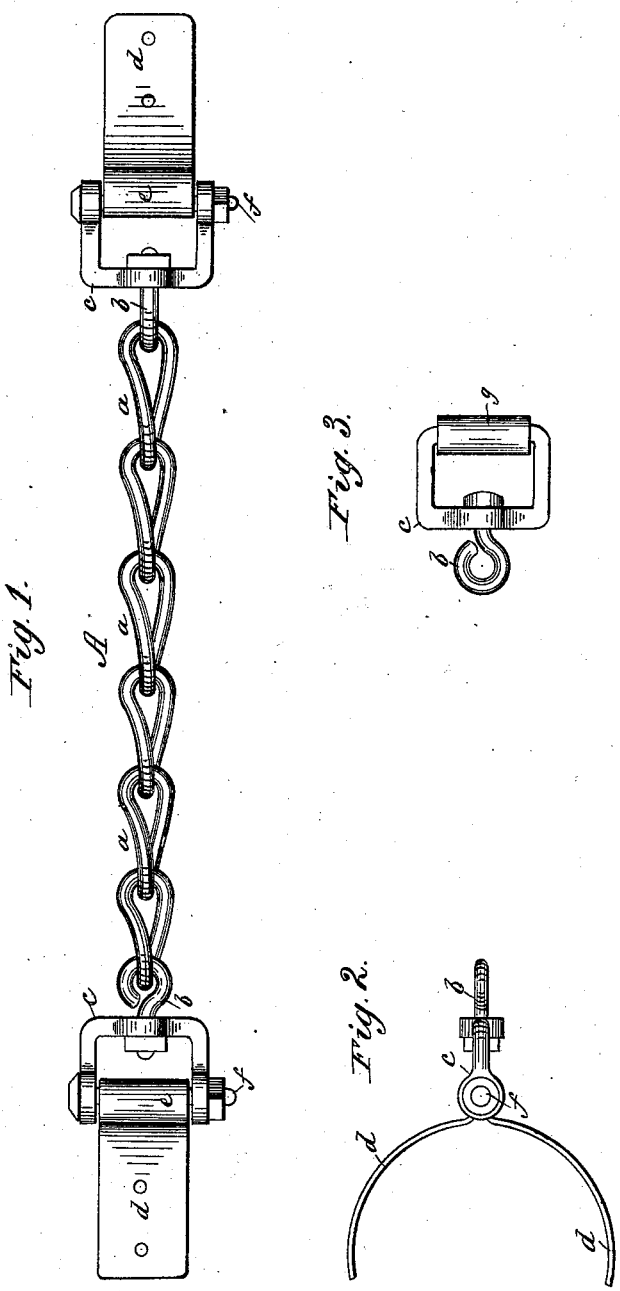

UNITED STATES PATENT OFFICE.

CHARLES J. GUSTAVESON, OF SALT LAKE CITY, UTAH TERRITORY.

HOPPLE.

SPECIFICATION forming part of Letters Patent No. 253,373, dated February 7, 1882.

Application filed October 26, 1881. (No model.)

*To all whom it may concern:*

Be it known that I, CHARLES J. GUSTAVESON, of Salt Lake City, in the county of Salt Lake and Territory of Utah, have invented a new and useful Improvement in Hopples, of which the following is a full, clear, and exact description, reference being had to the annexed drawings, forming part of this specification.

My invention consists of a hopple provided with curved plates for inclosing the legs of an animal, and a detachable chain connecting the plates, as will be hereinafter described.

In the accompanying drawings, Figure 1 is a side elevation of my improved hopple; Fig. 2, a plan view of the curved plate and swivel, and Fig. 3 is a modification.

The chain A is constructed of links $a$, which are twisted in the ordinary manner and provided with a swivel, $b$, at each end, connecting the chain to rectangular end links, $c$, by means of which the chain is to be secured to the hopple-straps. It will be observed that while the twisted links form a chain of sufficient flexibility to allow the animal to walk with ease the chain cannot readily be caught upon any obstruction whereby the animal shall be prevented from ranging at large.

As a means of connecting the chain to the hopple-straps, I provide a curved plate, $d$, which may be adapted to extend either partly or entirely around the animal's leg, and is provided with perforations by means of which it shall be riveted between the hopple-strap and leg-band, which latter parts are not shown. The center of the plate $d$ is curved so as to form a cylindrical bearing, $e$, for the end link, $c$; and for the purpose of making these parts detachable for the convenience of shipment I construct the end link, $c$, with its outer side formed of a removable bolt or screw, $f$, which is adapted to engage with the end link and the bearing in the plate. With this construction the hopple-straps are held in proper shape and strengthened, while the end links are allowed to oscillate forward and backward with the movement of the animal. Instead of securing the plate $d$ under the hopple-strap it may be riveted to the outside as well. I may also use a simple roller, $g$, with or without a bolt, in the end link, and secure the link to the hopple by passing the strap through the said link.

I am aware that a hopple having a chain with a swivel at each end has before been used, and therefore I do not broadly claim such a construction.

Having thus described my invention, what I claim as new, and desire to secure by Letters Patent, is—

A hopple consisting of the curved plates $d\ d$, adapted to inclose, or partly inclose, the legs of an animal, and having perforations whereby they shall be secured to hopple-straps, in combination with the detachable chain A, having twisted links $a$ and swivels $b\ b$ connecting said plates, substantially as shown and described.

CHARLES JOHN GUSTAVESON.

Witnesses:
JOHN LEWIS GRUNDHAND,
NIELS CHRISTENS CHRISTENSEN.